Feb. 27, 1968

H. H. SHAW 3,370,727

LATERALLY ADJUSTABLE CONVEYOR

Filed Nov. 12, 1965

INVENTOR.
HUGH H. SHAW
BY
Naylor & Neal
ATTORNEYS

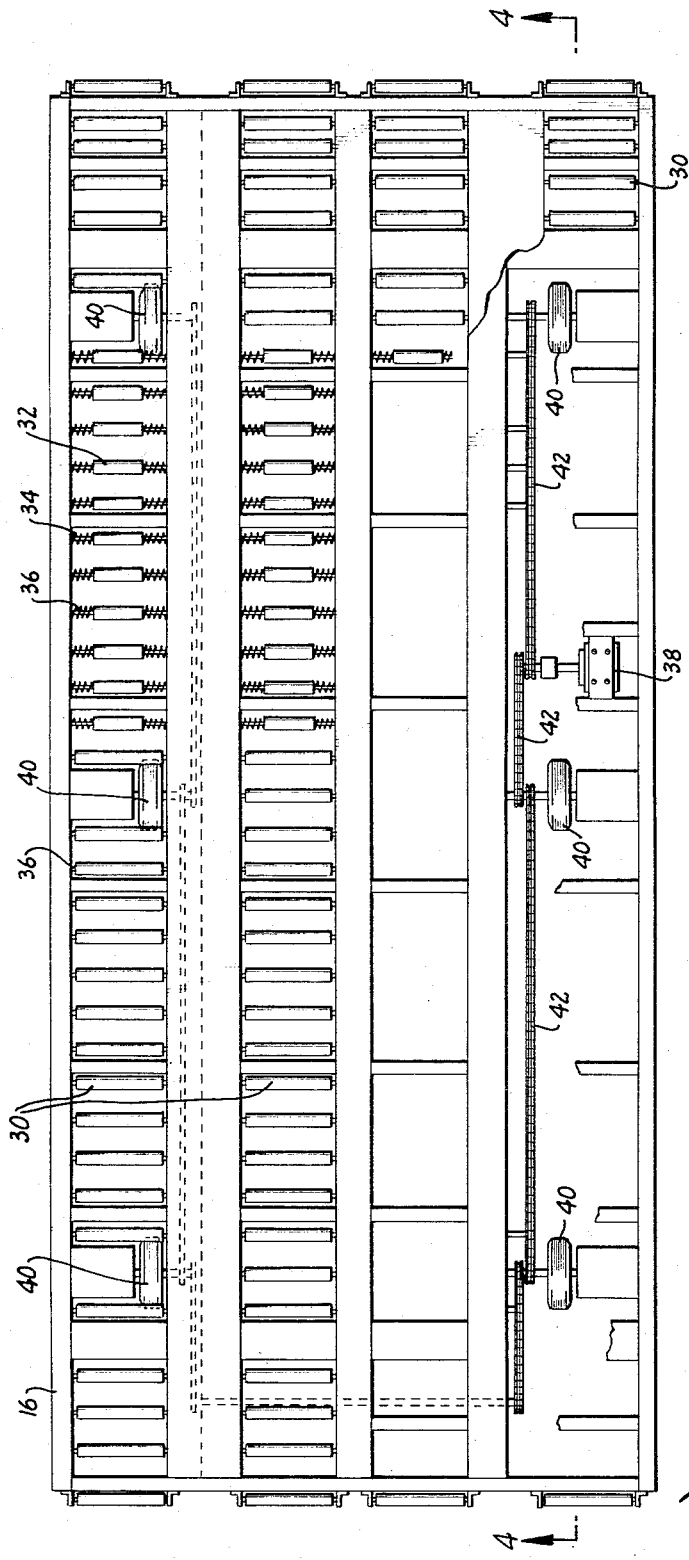

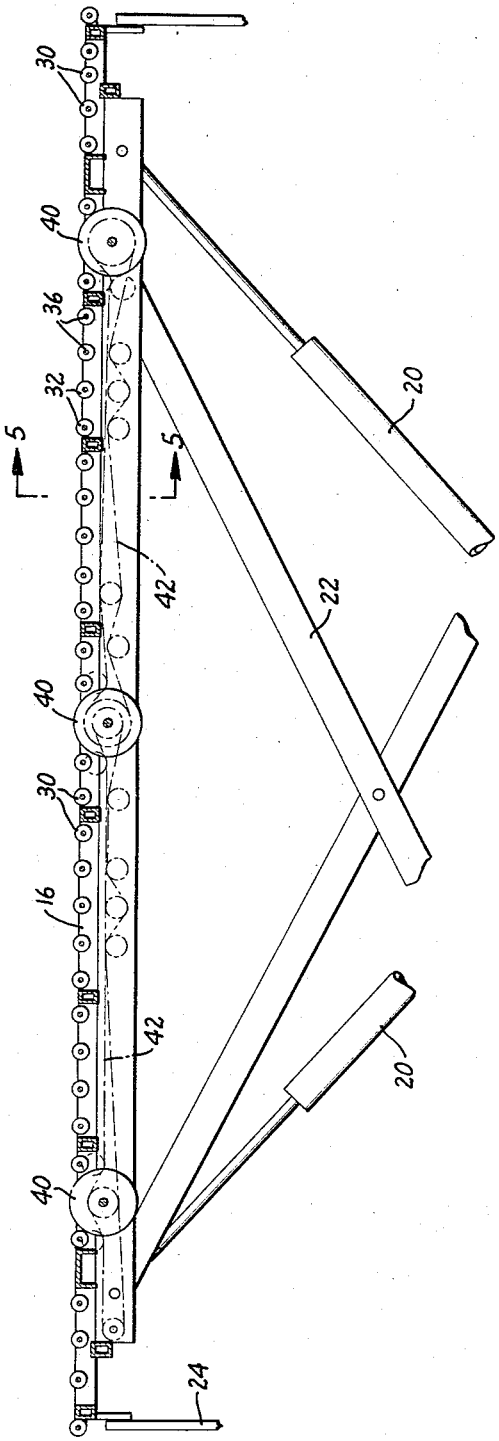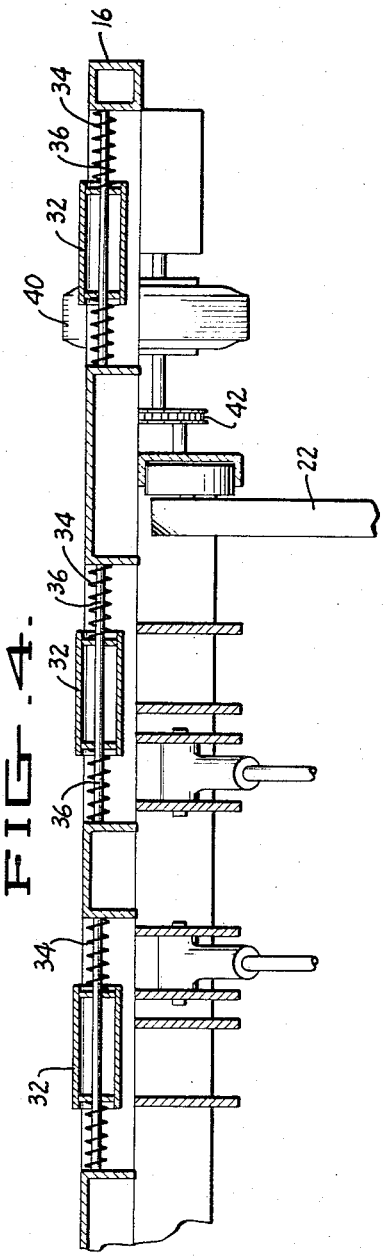

United States Patent Office 3,370,727
Patented Feb. 27, 1968

3,370,727
LATERALLY ADJUSTABLE CONVEYOR
Hugh H. Shaw, Salinas, Calif., assignor to American Sugar Company, Salinas, Calif., a corporation of New Jersey
Filed Nov. 12, 1965, Ser. No. 507,424
1 Claim. (Cl. 214—512)

ABSTRACT OF THE DISCLOSURE

An elevator with a free handling roller conveyor which includes (a) power driven drive wheels projecting through the conveying surface of the roller conveyor for driving freight over the conveyor in a predetermined direction, and (b) resilient support means for the rollers of the conveyor between two sets of drive wheels for permitting freight to be shifted on the conveyor in a direction perpendicular to the conveying direction of the freight.

---

This invention relates to an elevator for loading cargo onto aircraft and the like. More particularly, the invention relates to a low overhead high lift trailer or elevator having a loading conveyor for transporting cargo into the aircraft where the loading conveyor is laterally adjustable to a limited extent.

This invention relates to improvements in equipment of this type such as the elevator shown in the copending application of Victor H. Carder, Ser. No. 357,524, filed Apr. 6, 1964, now abandoned.

Apparatus of the type shown in the above mentioned application are employed for loading palletized cargo onto air freight aircraft. In certain situations, difficulties are encountered with that apparatus in fitting the last pallet of freight into an almost full aircraft fuselage. This difficulty arises where the last pallet is not in exact alignment with the space in the aircraft which must receive the pallet, and considerable difficulties are encountered in readjusting the position of the pallet.

It is therefore a principal object of this invention to provide a low overhead high lift trailer or elevator with a conveyor for conveying cargo in a longitudinal direction while permitting limited lateral movement of the cargo on the conveyor.

Other advantages of the invention will become apparent from the following description read in conjunction with the attached drawings in which:

FIG. 3 is an enlarged plan view, partially broken away, illustrating the upper section of the high lift trailer shown in FIG. 1;

FIG. 4 is a sectional view of the apparatus of FIG. 3 taken along the plane indicated at 3—3, and FIG. 5 is a sectional view taken along the plane indicated at 5—5 in FIG. 4.

Figure 1:
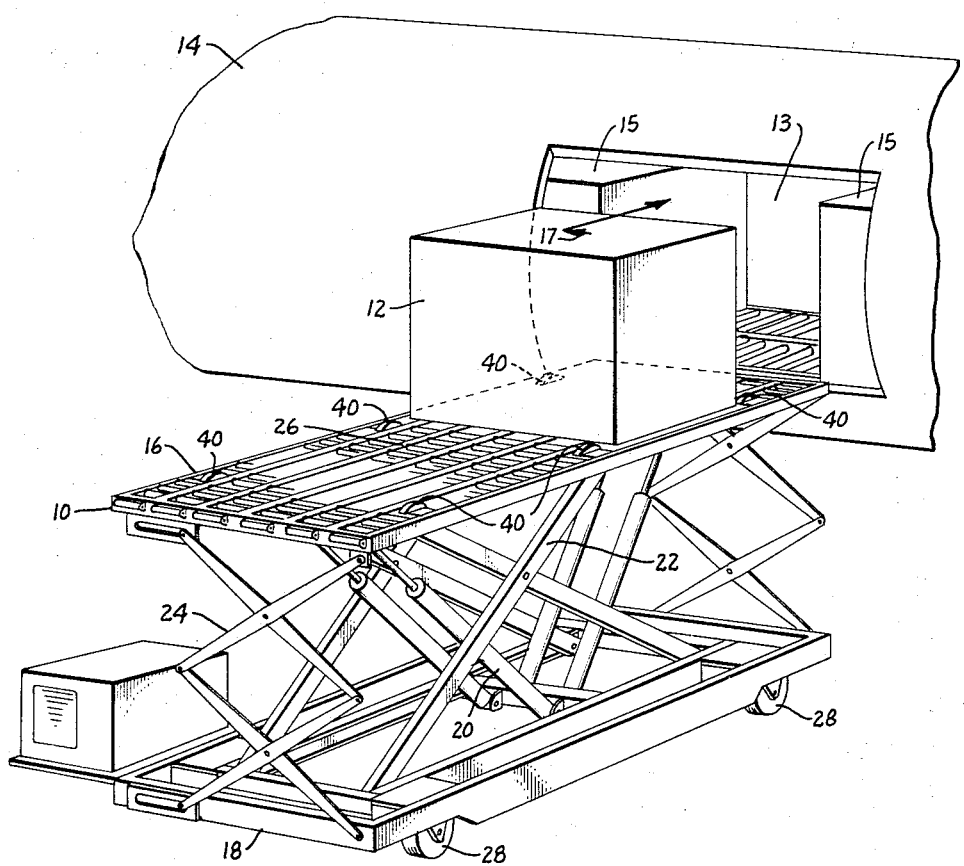
FIG. 1 is a perspective view illustrating an embodiment of the inventive device when used for loading cargo onto an aircraft.
Figure 2:
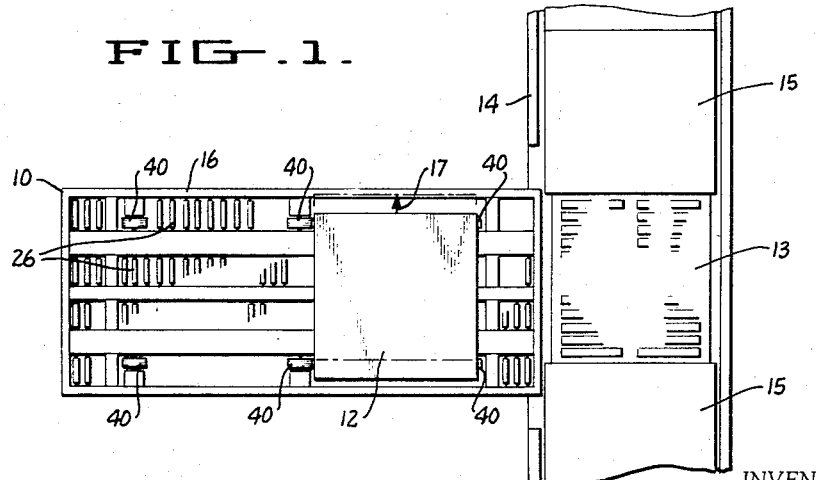
FIG. 2 is a top view of the apparatus of FIG. 1 with a portion of the aircraft fuselage broken away.

Referring now in detail to FIGS. 1 and 2, an embodiment of the low overhead high lift trailer is designated in its entirety by numeral 10 and is shown being used to load a cargo pallet 12 into the cargo space 13 of an aircraft 14. The trailer comprises an upper section 16, a lower section 18, hydraulic lift rams 20, scissors lift arms 22, double scissors lift arms 24, load conveying means indicated generally as 26 and wheels 28 as defined in greater detail in the above identified application.

The problem encountered with the apparatus of the above-mentioned application is illustrated in FIG. 2 where the position of the cargo pallet 12 is shown in full line.

A cargo pallet may often reach this position due to the positioning of the high lift trailer 10 with respect to the aircraft fuselage 14 and due to the particular manner in which the cargo pallet 12 is placed on the upper section 16 before the upper section 16 is lifted. It will be noted that the cargo pallet 12 in its full line position is out of alignment with the space 13 in the aircraft between pallets 15 into which the pallet 12 must be inserted. In order to align the pallet 12 with the space 13 it is necessary to move the pallet laterally in the direction of arrow 17, and it is very difficult to accomplish this motion by moving the trailer or by sliding the pallet transversely of the trailer. In accordance with this invention, means are provided to facilitate lateral shifting of the pallet to the phantom line position in FIG. 2.

Referring now in detail to FIGS. 3 and 4, the load conveying means 26 comprises antifriction rollers 30, special anti-friction rollers 32, a power source 38, and drive wheels 40 which are connected to the power source 38 by chain and sprocket mechanism 42 which permits the drive wheels 40 to be rotated to convey a pallet across the upper section under power. The distance between each pair of wheels 40 measured along the length of the upper section of the trailer is slightly less than the width of a cargo pallet so that a cargo pallet will be connected to the power drive system at all times. The special antifriction rollers 36 are provided on the upper section of the trailer in a local area between two sets of drive rollers 40 as illustrated in FIG. 3.

All of the antifriction rollers 30 and 32 are mounted on axles 36 which are supported on the upper section of the trailer. The axles for the rollers 30 are substantially the same length as the rollers 30, but the axles 36 for the special antifriction rollers 32 are substantially longer than the rollers 32 so that the rollers 32 may both rotate on the axles 36 and may move axially of the axles 36. Compression springs 34 are mounted on the axles 36 at opposite ends of the special rollers 32 to spring bias the rollers 32 into central positions on the axles.

The operation of the aforedescribed device will now be apparent. Cargo pallets may be moved onto the upper section 16 at ground level and conveyed across the upper section 16 under power by operation of the power source 38. If, as sometimes happens, the space 13 into which a pallet must be inserted is slightly offset from the path of the pallet 12, a workman may push against one side of the pallet when the bulk of the pallet rests on the special rollers 32 to move the pallet from the full line position of FIG. 2 to the phantom line position of FIG. 2. During this motion, the compression springs on the opposite side of the pallet are compressed. When the pallet is moved off of the rollers 32 the compression springs 34 move the rollers 32 back to their central position so that when any pallet is moved onto them they are in a position to facilitate lateral displacement of the load on the conveyor.

While certain specific embodiments of the invention have been illustrated and described in detail herein, many modifications thereof may be made without departing from the spirit and the scope of the invention.

What is claimed is:
1. A low overhead, high lift elevator comprising:
 (A) a lower frame having ground engaging wheels;
 (B) an upper frame;
 (C) lift means for raising the upper frame above the lower frame, and;
 (D) load conveying means on the upper frame comprising;
  (1) a plurality of idler rollers mounted on said upper frame for rotation about generally parallel and horizontal axes;

(2) a first pair of drive wheels mounted on said upper frame for rotation about a first axis parallel to the axes of said idler rollers with the peripheries of said drive wheels projecting above said idler rollers for engaging cargo and driving it over said idler rollers;

(3) a second pair of drive wheels mounted on said upper frame for rotation about a second axis which is parallel to said first axis and positioned a substantial distance from said first axis with a substantial number of said idler rollers positioned between said first and second axes and with the peripheries of said drive wheels projecting above said idler rollers;

(4) power means for rotating said drive wheels about their axes, and;

(5) resilient support means for said substantial number of idler rollers between said first and second axes for permitting said idler rollers to be moved in both directions parallel to their axes whereby cargo on said upper frame between said pairs of drive wheels can be moved in directions perpendicular to the direction in which such cargo is moved by said drive wheels.

References Cited

UNITED STATES PATENTS

| | | | |
|---|---|---|---|
| 1,824,201 | 9/1931 | Eisenberg | 214—16.42 X |
| 2,129,340 | 9/1938 | Webber. | |
| 3,139,963 | 7/1964 | Nadler et al. | 193—37 |
| 3,147,844 | 9/1964 | Mountz | 198—34 |
| 3,148,761 | 9/1964 | Niederer et al. | 198—34 X |
| 3,279,631 | 10/1966 | McCartney | 193—35 X |

GERALD M. FORLENZA, *Primary Examiner.*

ALBERT J. MAKAY, *Examiner.*